(12) United States Patent
Ono et al.

(10) Patent No.: US 10,363,927 B2
(45) Date of Patent: Jul. 30, 2019

(54) SPEED CHANGE CONTROL APPARATUS FOR WORK VEHICLE

(71) Applicant: ISEKI & CO., LTD., Matsuyama-shi (JP)

(72) Inventors: Koki Ono, Ehime-ken (JP); Hiroshi Kamoda, Ehime-ken (JP)

(73) Assignee: ISEKI & CO., LTD., Matsuyama-shi (JP)

(*) Notice: Subject to any disclaimer, the term of this patent is extended or adjusted under 35 U.S.C. 154(b) by 237 days.

(21) Appl. No.: 15/079,704

(22) Filed: Mar. 24, 2016

(65) Prior Publication Data

US 2016/0280222 A1 Sep. 29, 2016

(30) Foreign Application Priority Data

Mar. 25, 2015 (JP) .................................. 2015-062798

(51) Int. Cl.
*B60W 30/02* (2012.01)
*B60W 30/18* (2012.01)
*B60W 10/103* (2012.01)
*B60W 10/101* (2012.01)
(Continued)

(52) U.S. Cl.
CPC ............. *B60W 30/025* (2013.01); *B60K 6/12* (2013.01); *B60W 10/06* (2013.01);
(Continued)

(58) Field of Classification Search
CPC .. B60W 30/025; B60W 30/18; B60W 30/103; B60W 30/06; B60W 30/101
See application file for complete search history.

(56) References Cited

U.S. PATENT DOCUMENTS

| 5,545,106 A | 8/1996 | Senger et al. |
| 5,592,817 A * | 1/1997 | Nishimura ............ B60W 10/06 60/431 |
| 2010/0042301 A1* | 2/2010 | Shimizu .......... B60W 30/18063 701/58 |

FOREIGN PATENT DOCUMENTS

| DE | 43 12 415 A1 | 10/1994 |
| EP | 0 622 263 A2 | 11/1994 |

(Continued)

OTHER PUBLICATIONS

Extended European Search Report dated Dec. 12, 2016 in patent application No. 16161581.0.

(Continued)

*Primary Examiner* — Jelani A Smith
*Assistant Examiner* — Kelly D Williams
(74) *Attorney, Agent, or Firm* — Oblon, McClelland, Maier & Neustadt, L.L.P.

(57) ABSTRACT

A speed change control apparatus for a work vehicle includes a hydraulic continuously variable speed transmission that performs speed change on power input from an engine by changing a trunnion shaft angle based on a depressing amount of a speed change pedal and outputs the power, a pedal position detector that detects a pedal position responsive to the depressing amount of the speed change pedal, and a control unit that controls a number of revolutions of the engine and the trunnion shaft angle of the hydraulic continuously variable speed transmission based on a detection value of the pedal position detector. The control unit performs control so that the trunnion shaft angle is maximized at a second pedal position set to a position shallower than a first pedal position at which the number of revolutions of the engine is maximized by a depressing operation of the speed change pedal.

12 Claims, 13 Drawing Sheets

(51) Int. Cl.
*B60K 6/12* (2006.01)
*B60W 10/06* (2006.01)
*B60W 20/00* (2016.01)

(52) U.S. Cl.
CPC ........ *B60W 10/101* (2013.01); *B60W 10/103* (2013.01); *B60W 20/00* (2013.01); *B60W 30/18* (2013.01); *B60W 2300/152* (2013.01); *B60W 2510/0638* (2013.01); *B60W 2510/1005* (2013.01); *B60W 2540/10* (2013.01); *B60W 2540/103* (2013.01); *B60W 2710/0644* (2013.01); *B60W 2710/10* (2013.01)

(56) References Cited

FOREIGN PATENT DOCUMENTS

| | | |
|---|---|---|
| JP | 2006-007819 | 1/2006 |
| JP | 2012-077763 | 4/2012 |
| JP | 2013-7470 | 1/2013 |
| JP | 2013007470 A * | 1/2013 |
| JP | 2013-204783 | 10/2013 |
| JP | 2013-226960 | 11/2013 |
| JP | 2013-245810 | 12/2013 |

OTHER PUBLICATIONS

Japanese Office Action with English machine translation dated Aug. 14, 2018 in corresponding Japanese Patent Application No. 2015-062798, citing documents AO-AS therein (5 pages).

* cited by examiner

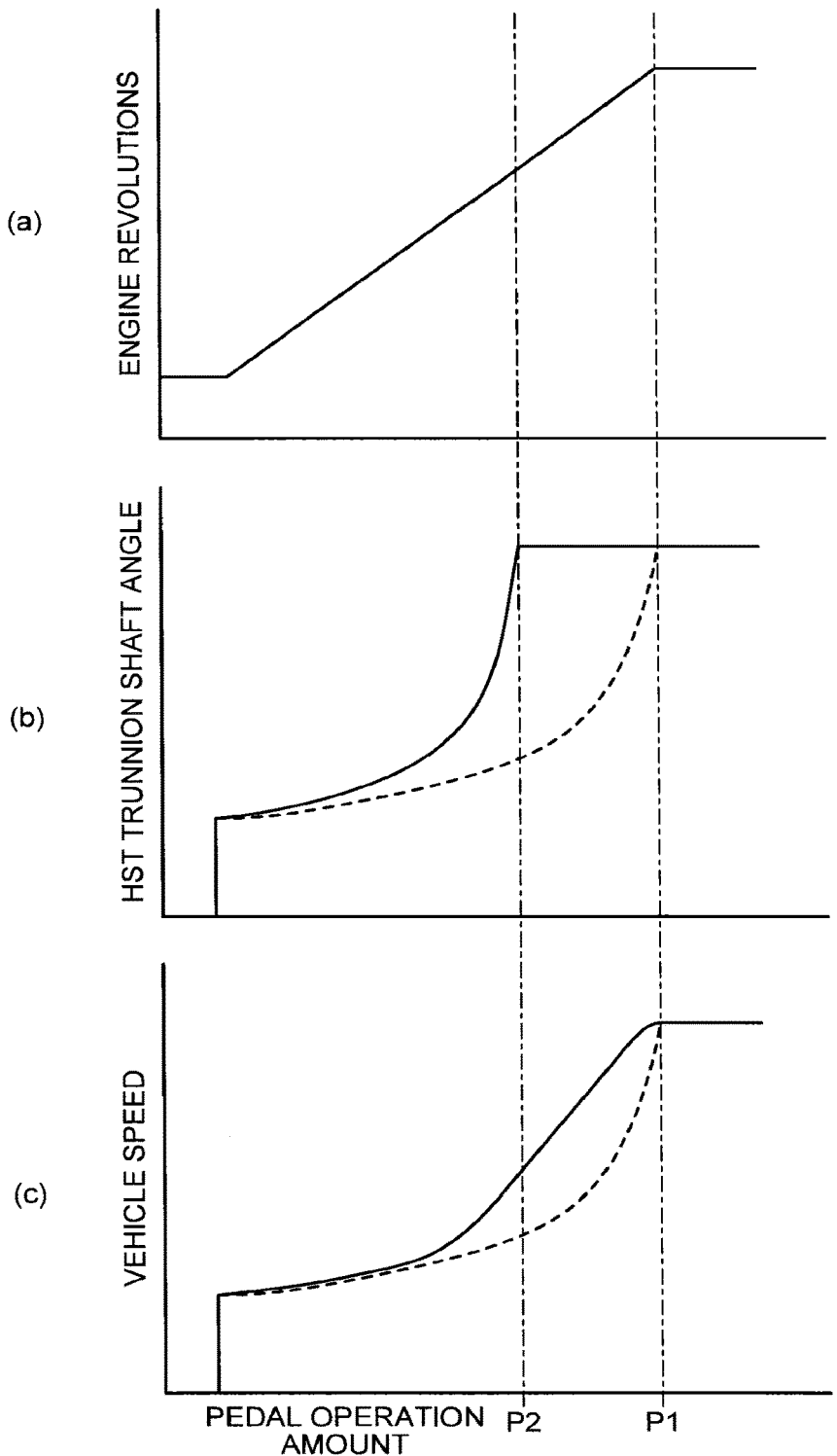

<TRAVEL SPEED ADJUSTMENT MODE>

<ENGINE REVOLUTIONS ADJUSTMENT MODE>

SPEED CHANGE CONTROL APPARATUS FOR WORK VEHICLE

CROSS-REFERENCE TO RELATED APPLICATIONS

The present application claims priority to and incorporates by reference the entire contents of Japanese Patent Application No. 2015-062798 filed in Japan on Mar. 25, 2015.

BACKGROUND OF THE INVENTION

1. Field of the Invention

The embodiment discussed herein is directed to a speed change control apparatus for a work vehicle.

2. Description of the Related Art

Conventionally, there have been speed change control apparatuses of work vehicles such as tractors that detect movements of a speed change pedal by a pedal sensor and control output of an engine and a hydraulic continuously variable speed transmission (HST: hydro static transmission) based on a detection value to adjust a travel speed. The hydraulic continuously variable speed transmission includes a variable displacement hydraulic pump and a fixed displacement hydraulic motor, rotates a trunnion shaft coupled to a movable swash plate of the hydraulic motor, and changes the inclination of the movable swash plate, whereby the rotation of the hydraulic motor can be changed.

Japanese Patent Application Laid-open No. 2013-7470 discloses a technique that examines a relation between a drive current and the number of revolutions of an output shaft of a hydraulic continuously variable speed transmission in an adjustment mode and sets a current value at which the output shaft of the hydraulic continuously variable speed transmission starts to move and a current value at which the number of revolutions of the output shaft is maximized for each body, for example.

Even when the hydraulic continuously variable speed transmission, an interlocking mechanism with a speed change pedal coupled to this hydraulic continuously variable speed transmission in an interlocked manner, or the like differs from one work vehicle's body to another, the speed change control apparatus can perform control so as to give a certain set speed at a certain turning position of the speed change pedal. Consequently, a travel speed by the hydraulic continuously variable speed transmission can be prevented from varying from one body to another.

Literature related to the conventional technique is Japanese Patent Application Laid-open No. 2013-7470, for example.

However, the speed change control apparatus for the work vehicle disclosed in Japanese Patent Application Laid-open No. 2013-7470 can sometimes give a nonlinear change in a trunnion shaft angle of the hydraulic continuously variable speed transmission relative to a depressing amount of the speed change pedal in design in which a turning support of the speed change pedal and a terming support of the pedal sensor are offset from each other, for example. In other words, the technique of Japanese Patent Application Laid-open No. 2013-7470 can cause an operator to feel uneasy with an operation feeling of the speed change pedal and still has room for improvement in the operation feeling.

SUMMARY OF THE INVENTION

It is an object of the present invention to at least partially solve the problems in the conventional technology. A speed change control apparatus for a work vehicle includes a hydraulic continuously variable speed transmission, a pedal position detector, and a control unit. The hydraulic continuously variable speed transmission performs speed change on power input from an engine by changing a trunnion shaft angle based on a depressing amount of a speed change pedal and outputs the power. The pedal position detector detects a pedal position responsive to the depressing amount of the speed change pedal. The control unit controls a number of revolutions of the engine and the trunnion shaft angle of the hydraulic continuously variable speed transmission based on a detection value of the pedal position detector. The control unit performs control so that the trunnion shaft angle is maximized at a second pedal position set to a position shallower than a first pedal position at which the number of revolutions of the engine is maximized by a depressing operation of the speed change pedal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 9 is an explanatory diagrams of an example of speed change control on the tractor as the work vehicle according to the embodiment;

DETAILED DESCRIPTION OF THE PREFERRED EMBODIMENTS

The following describes an embodiment of the present invention in detail based on the drawings. The following embodiment includes similar components including modifications. Consequently, the following gives common symbols to those similar components and omits duplicate descriptions. The components in the following embodiment include ones that can easily be envisioned by those skilled in the art, substantially the same ones, and ones in what is called a range of equivalents. The present invention is not limited by the following embodiment.

Figure 1:
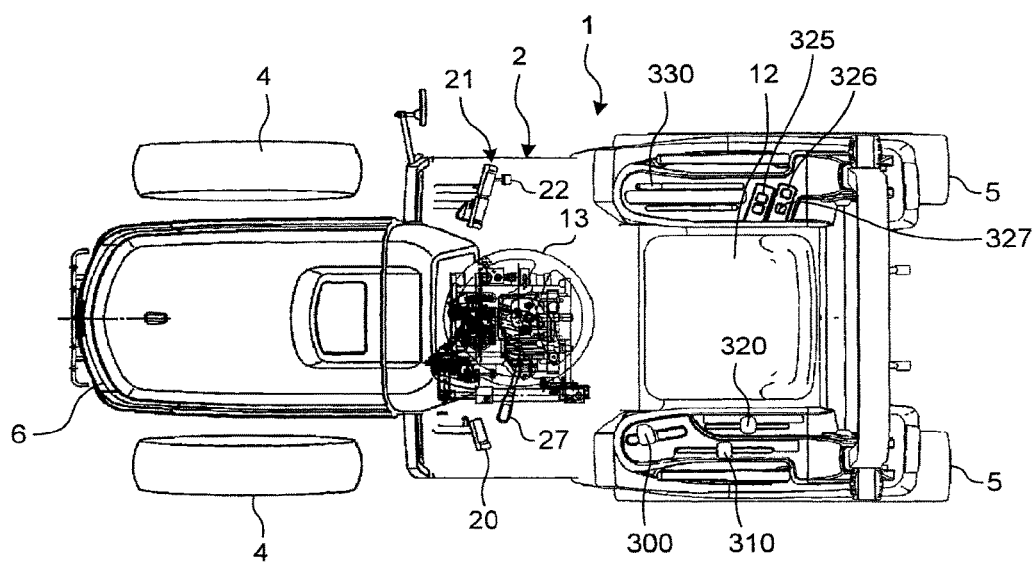
FIG. 1 is a plan view of a tractor as a work vehicle according to an embodiment.
Figure 2:
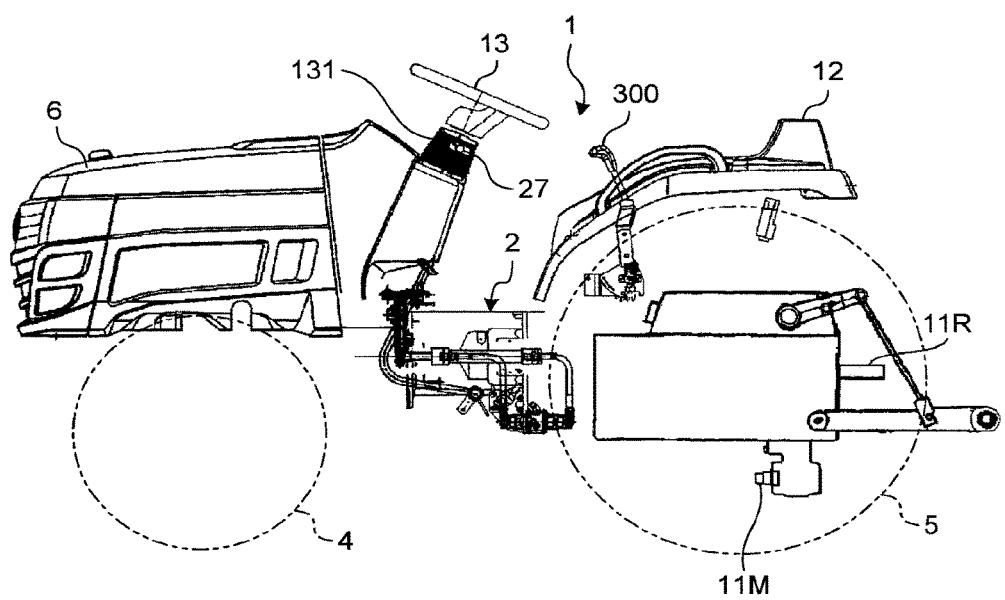
FIG. 2 is a side view of the tractor with part thereof omitted.
Figure 3:
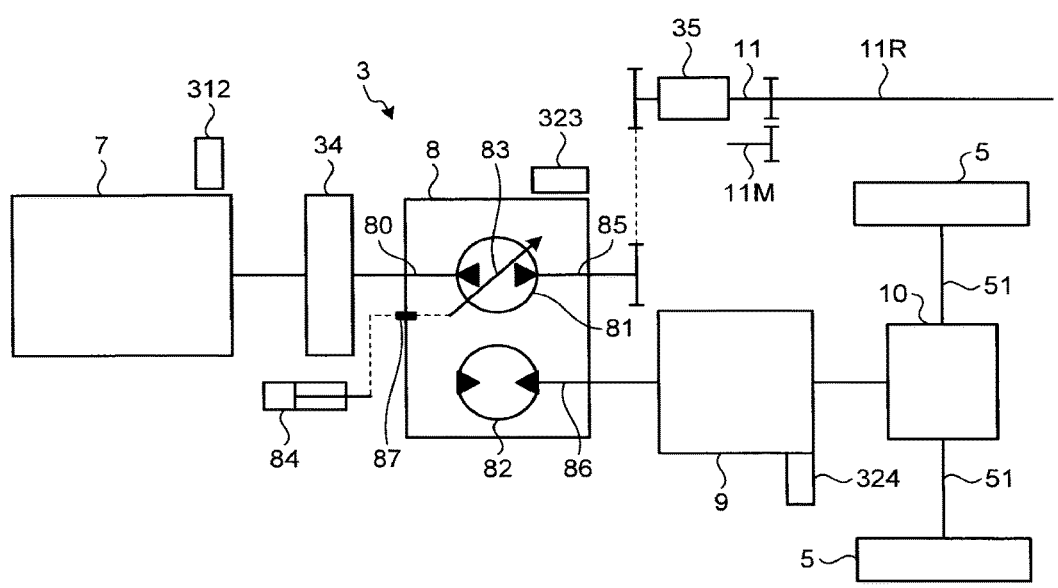
FIG. 3 is an explanatory diagram of a power transmission path of the tractor.
Figure 4A:
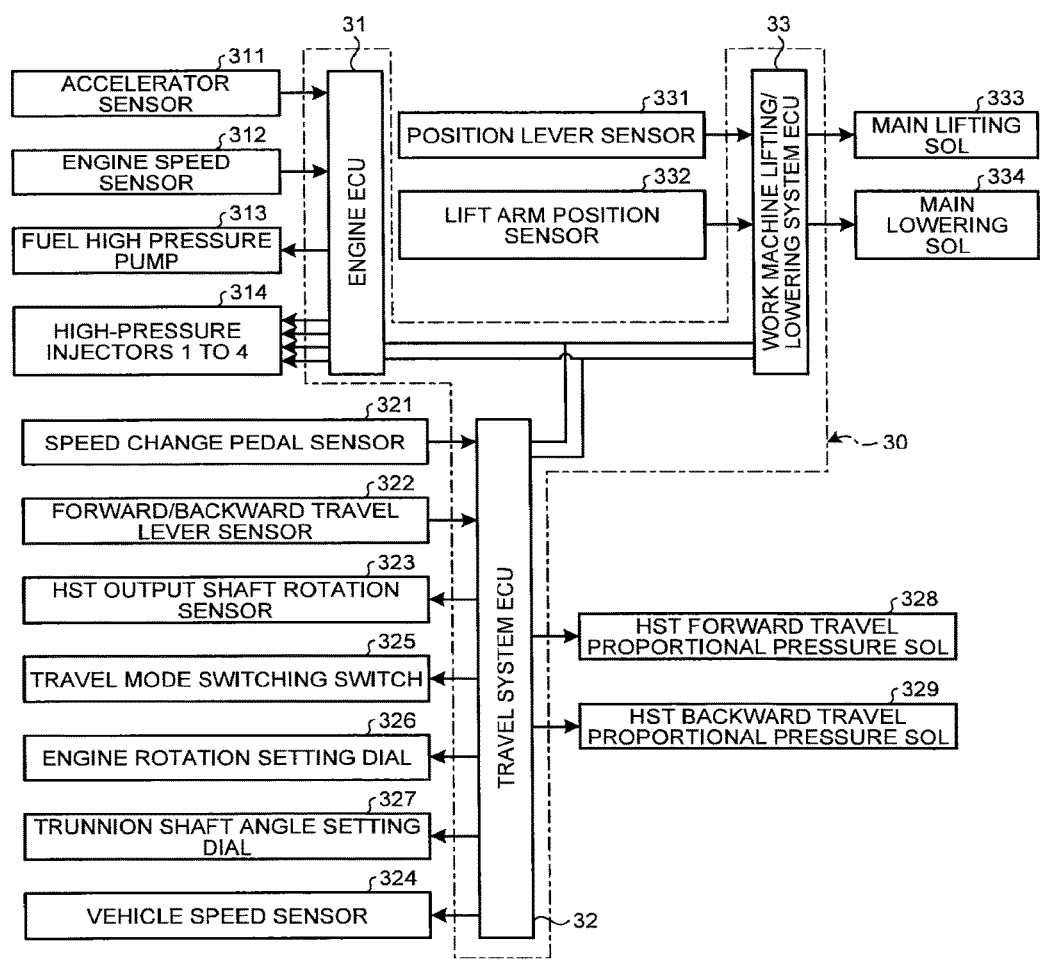
FIG. 4A is a control block diagram of the tractor.
Figure 4B:
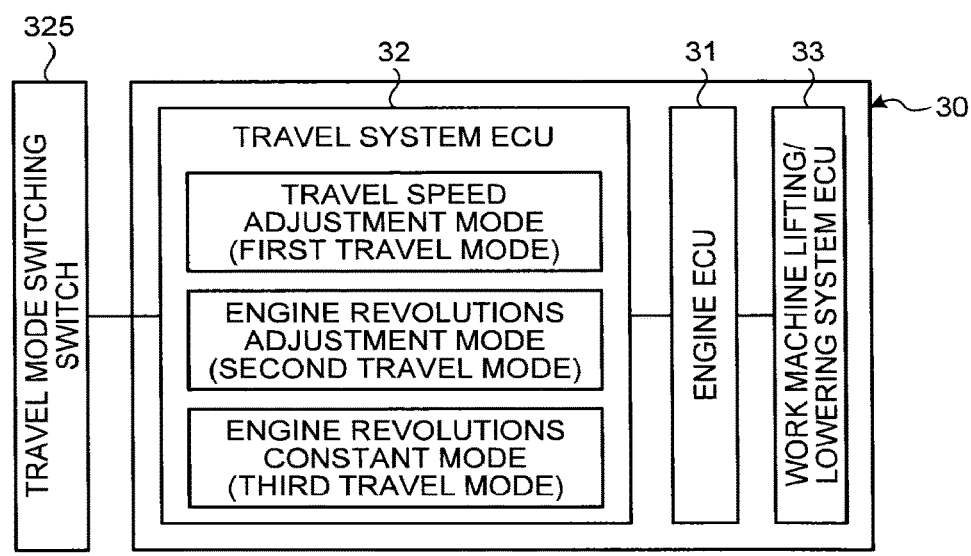
FIG. 4B is an explanatory diagram of a controller.

A work vehicle according to the embodiment will be described as a tractor 1. FIG. 1 is a plan view of the tractor 1 as the work vehicle according to the embodiment, and FIG. 2 is a side view of the tractor 1 with part thereof omitted. FIG. 3 is an explanatory diagram of a power transmission path of the tractor 1, FIG. 4A is a control block diagram of the tractor 1, and FIG. 4B is an explanatory diagram of a controller 30.

The tractor 1 is a work vehicle that performs work in a cultivated land or the like and includes front wheels 4 provided as wheels for steering and rear wheels 5 provided as drive wheels on both right and left sides of a body 2 as illustrated in FIG. 1 and FIG. 2. An engine 7 (refer to FIG. 3) is mounted within a hood 6 provided forward of the body 2. Output from the engine 7 is transmitted to the right and left rear wheels 5 and 5 via a power transmission mechanism 3 (refer to FIG. 3). As illustrated in FIG. 2, a rear power take-off (PTO) shaft 11 on which a work machine such as a rotary cultivator (not illustrated) can be mounted is arranged rearward of the body 2.

As illustrated in FIG. 3, the power transmission mechanism 3 includes a hydraulic continuously variable speed transmission 8 using operating oil and an auxiliary variable speed transmission 9 that performs speed change using a mechanical mechanism. Specifically, the power transmission mechanism 3 appropriately performs speed reduction (speed change) on power generated by the engine 7 by the hydraulic continuously variable speed transmission 8 and the auxiliary variable speed transmission 9 and transmits the power to the rear wheels 5 via a differential case 10. The rear wheels 5 are thus driven by the transmitted power.

The hydraulic continuously variable speed transmission 8 is a static hydraulic continuously variable speed transmission called hydro static transmission (HST) and can transmit drive power from the engine 7 to the rear wheels 5 as described below in detail. The following may refer to the hydraulic continuously variable speed transmission as HST.

The tractor 1 according to the present embodiment mounts the rear wheels 5 on a rear wheel drive shaft 51 to which the power from the engine 7 is transmitted and is two-wheel drive in which only the rear wheels 5 are driven. However, the tractor 1 can also achieve four-wheel drive by transmitting the power generated by the engine 7 and subjected to speed reduction by the hydraulic continuously variable speed transmission 8 and the auxiliary variable speed transmission 9 further also to the front wheels 4. A four-wheel drive state and a two-wheel drive state can be switched to each other. As the two-wheel drive, the power of the engine 7 may be transmitted to the right and left front wheels 4 and 4, not to the right and left rear wheels 5 and 5.

As illustrated in FIG. 1 and FIG. 2, an operating seat 12 on which a driver sits when operating the tractor 1 is provided in the central part of the body 2, and a steering wheel 13 for use in the steering of the front wheels 4 is provided forward of the operating seat 12. The steering wheel 13 is rotatably mounted on the upper end side of a steering wheel post 131.

A forward/backward travel switching lever 27 that switches a travel direction when the tractor 1 travels between forward and backward is arranged on the steering wheel post 131.

The forward/backward travel switching lever 27 is tilted forward when causing the tractor 1 to travel forward and is tilted backward when causing the tractor 1 to travel backward, thereby switching between forward travel and backward travel of the body 2 by the power from the engine 7. The forward/backward travel switching lever 27 has a neutral position in between a forward travel position and a backward travel position, and this neutral position can cause the tractor 1 not to travel forward or backward. As to the forward/backward travel switching lever 27, an operation position (the forward travel position, the backward travel position, and the neutral position) is detected by a forward/backward travel lever sensor 322 (refer to FIG. 4A).

Various kinds of pedals are arranged on the downward side of the steering wheel post 131, that is, around the feet of the driver when the driver sits on the operating seat 12. Specifically, as illustrated in FIG. 1, a clutch pedal 20 is arranged left forward of the operating seat 12, and a brake pedal 21 that brakes the rear wheels 5 in accordance with a depressing operation as a pedal operation is arranged right forward thereof. Although the brake pedal 21 receives the depressing operation for braking the rear wheels 5 as the pedal operation in the present embodiment, the brake pedal 21 may receive the depressing operation in order to brake at least either the right and left front wheels 4 or the right and left rear wheels 5.

A speed change pedal 22 that changes a travel speed of the body 2 is provided so as to be adjacent to the brake pedal 21. The travel speed of the tractor 1 according to the present embodiment is controlled to be a set travel speed by adjusting the number of revolutions of the engine 7 in accordance with a depressing amount of the speed change pedal 22 and rotating a trunnion shaft 87 (refer to FIG. 3) of the hydraulic continuously variable speed transmission 8.

Specifically, as illustrated in FIG. 4A and FIG. 4B, the tractor 1 includes the controller 30 that functions as a speed change control apparatus in a broad sense. The controller 30 includes various kinds of controllers (ECU: electronic control unit) 31, 32, and 33 that exchange control signals through controller area network (CAN) communication and performs operational control on a travel system, the engine 7, and a work machine lifting/lowering system. A travel system controller (ECU) 32 in the present embodiment corresponds to a control unit.

As described below in detail, the travel system controller 32 performs control so that a trunnion shaft angle of the hydraulic continuously variable speed transmission 8 is maximized at a second pedal position P2 set to a position shallower than a first pedal position P1 at which the number of revolutions of the engine 7 is maximized by a depressing operation of the speed change pedal 22, for example (refer to FIG. 9). The following may refer to the engine controller as an ECU.

Figure 5:
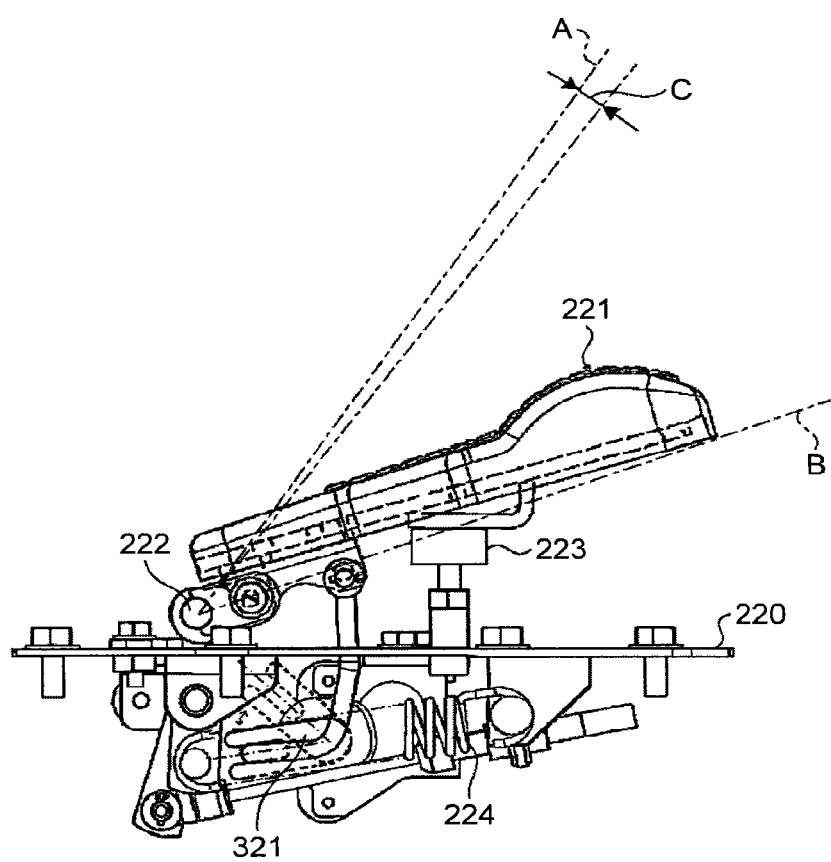
FIG. 5 is an explanatory diagram of a speed change pedal of the tractor.

The following describes the speed change pedal 22 with reference to FIG. 5. FIG. 5 is an explanatory diagram of the speed change pedal 22 of the tractor 1 according to the present embodiment. As illustrated in FIG. 5, as to the speed change pedal 22, a basal end of a pedal main body 221 is turnably coupled to a pivot 222 on the upper face side of a bracket 220 mounted on the body 2. The pedal main body 221 turns from a release position A to a maximum depressed position B by a pedal operation by the driver. A stopper 223 is provided at a position below the pedal main body 221, and the pedal main body 221 depressed from the release position A is brought into contact with the stopper 223 at the maximum depressed position B, thereby limiting the turning.

A spring 224 that biases the pedal main body 221 so as to be the release position A is provided on the lower face side of the bracket 220. A speed change pedal sensor 321 (refer to FIG. 4A) that detects a pedal operation (a depressing operation) of the speed change pedal 22 by the driver is provided on the opposite side of the spring 224. The speed change pedal sensor 321 corresponds to a pedal position detector that detects a pedal position responsive to a depressing amount of the speed change pedal 22 (the pedal main body 221) and outputs a detection result to a travel system ECU 32. In the present embodiment, a turning support (not illustrated) of the speed change pedal sensor 321 is offset from the pivot 222 as a turning support of the pedal main body 221.

As illustrated in FIG. 1, a main speed change lever 300 by which operations related to speed change during travel are performed, an auxiliary speed change lever 310, and a PTO clutch lever 320 that engages or disengages the drive of the PTO shaft 11 driving a work machine mounted on the rear of the tractor 1 are arranged on the left side of the operating seat 12 of the tractor 1.

The main speed change lever 300 can set the speed of the tractor 1 from first to eighth, for example, and the travel system ECU 32 adjusts the number of revolutions of the engine 7 and adjusts the angle of the trunnion shaft 87 (the trunnion shaft angle) of the hydraulic continuously variable speed transmission 8 so as to give the set speed.

The auxiliary speed change lever 310 is for performing speed change on the auxiliary variable speed transmission 9 (refer to FIG. 3) so as to set the travel speed of the body 2 to three stages of low speed, middle speed, and high speed. The auxiliary variable speed transmission 9 has a plurality of selectively settable gear ratios so that the states of the low speed, the middle speed, and the high speed will have different gear ratios. The low speed and the middle speed changed by the auxiliary speed change lever 310 are suitable for traveling when performing work in a cultivated land, whereas the high speed is suitable for traveling a road when moving between cultivated lands.

A position lever 330 that adjusts the height of the work machine coupled to the rear of the body 2 is arranged on the right side of the operating seat 12. An operation position of the position lever 330 is detected by a position lever sensor 331 (refer to FIG. 4A), and this position lever sensor 331 outputs a detection result to a work machine lifting/lowering system ECU 33.

The following describes the power transmission mechanism 3 with reference to FIG. 3. The power transmission mechanism 3 is provided within a transmission case (not illustrated) arranged on the rear side of the engine 7. The rotation of an output shaft of the engine 7 is transmitted to an input shaft 80 of the hydraulic continuously variable speed transmission 8 through a damper 34 via a main clutch (not illustrated) engaged or disengaged by the clutch pedal 20 (FIG. 1). In other words, the power of the engine 7 is input to the hydraulic continuously variable speed transmission 8.

The hydraulic continuously variable speed transmission 8 includes a variable displacement hydraulic pump 81 and a fixed displacement hydraulic motor 82 and changes the rotation of the hydraulic motor 82 by changing the inclination of a movable swash plate 83 of the hydraulic pump 81. The inclination of the movable swash plate 83 is changed by an actuator 84 such as a hydraulic cylinder that actuates by detecting movements of the speed change pedal 22 and the main speed change lever 300 or the forward/backward travel switching lever 27, whereby the speed of the rotation of a motor output shaft 86 of the hydraulic motor 82 is changed. The rotation of a pump output shaft 85 directly connected to the hydraulic pump 81 has the same number of revolutions as that of the input shaft 80.

The rotation of the pump output shaft 85 is transmitted to the PTO shaft 11 via a PTO clutch 35 and is finally taken out to the outside of the transmission case by a rear PTO shaft 11R or a mid PTO shaft 11M. With this configuration, the power of the engine 7 is taken out to the outside, thereby enabling the work machine such as a rotary coupled to the rear PTO shaft 11R in an interlocked manner or a mower coupled to the mid PTO shaft 11M in an interlocked manner to be driven.

The motor output shaft 86 of the hydraulic motor 82 drives the rear wheels 5 and 5 through the auxiliary variable speed transmission 9 via the differential case 10. The number of revolutions of the motor output shaft 86 is detected by an HST output shaft rotation sensor 323 (refer to FIG. 4A). The HST output shaft rotation sensor 323 outputs a detection result to the travel system ECU 32.

The movable swash plate 83 of the hydraulic continuously variable speed transmission 8 is coupled to the trunnion shaft 87 coupled to a trunnion arm (not illustrated) in an interlocked manner. The trunnion shaft 87, the trunnion arm, and the movable swash plate 83 are then interlocked with each other. In other words, the trunnion angle is changed, whereby the hydraulic continuously variable speed transmission 8 according to the present embodiment performs speed change on the power input from the engine 7 and outputs the power.

A turning angle (position) of the trunnion shaft 87 and the trunnion arm and an inclination angle of the movable swash plate 83 change mutually correspondingly. Given this situation, in the present embodiment, a trunnion arm angle sensor that detects the turning angle of the trunnion arm is provided to detect the trunnion shaft angle.

The power transmission mechanism 3 includes a neutrality holding mechanism (not illustrated) that holds the trunnion arm and the trunnion shaft 87 at a neutral position.

An engine ECU 31, the travel system ECU 32, and the work machine lifting/lowering system ECU 33 included in the control unit each include a central processing unit (CPU), a read only memory (ROM), and a random access memory (RAM), for example. The controller 30 executes a computer program stored in the ROM, thereby controlling the respective parts of the tractor 1.

As illustrated in FIG. 4A, an accelerator sensor 311 and an engine speed sensor 312 are connected to the engine ECU 31. The accelerator sensor 311 detects a turning angle of the speed change pedal 22 and outputs a detection result to the controller 30. The engine speed sensor 312 detects the number of revolutions of the engine 7 and outputs a detection result to the controller 30.

The engine ECU 31 outputs a rail pressure to a fuel high pressure pump 313 and an injection signal to high-pressure injectors 314. Injection timing to these high-pressure injectors 314 is adjusted by the engine ECU 31 based on a detection value of the accelerator sensor 311, thereby enabling an output the number of revolutions of the engine 7 to be freely adjusted.

The speed change pedal sensor 321, the forward/backward travel lever sensor 322, the HST output shaft rotation sensor 323, and a vehicle speed sensor 324 are connected to the travel system ECU 32. The vehicle speed sensor 324 detects the travel speed of the body 2 from the rotation of the shaft of the rear wheels 5 and outputs a detection result to the travel system ECU 32.

The travel system ECU 32 outputs a forward travel output signal to an HST forward travel proportional pressure solenoid (HST forward travel proportional pressure sol) 328, a backward output signal to an HST backward travel proportional pressure solenoid (HST backward travel proportional pressure sol) 329, and the like. In other words, the travel system ECU 32 included in the control unit can control the number of revolutions of the engine 7 and the trunnion shaft angle of the hydraulic continuously variable speed transmission 8 based on a detection value of the speed change pedal sensor 321 (the pedal position detector).

Furthermore, a travel mode switching switch 325, an engine rotation setting dial 326, and a trunnion shaft angle setting dial 327 are connected to the travel system ECU 32 as described below in detail.

The position lever sensor 331 and a lift arm position sensor 332 are connected to the work machine lifting/lowering system ECU 33. The lift arm position sensor 332 detects a lift position signal and outputs a detection result to the work machine lifting/lowering system ECU 33. The work machine lifting/lowering system ECU 33 outputs a lifting signal to a main lifting solenoid (main lifting sol) 333 of a hydraulic cylinder (not illustrated) and outputs a lowering signal to a main lowering solenoid (main lowering sol) 334.

Figure 6:
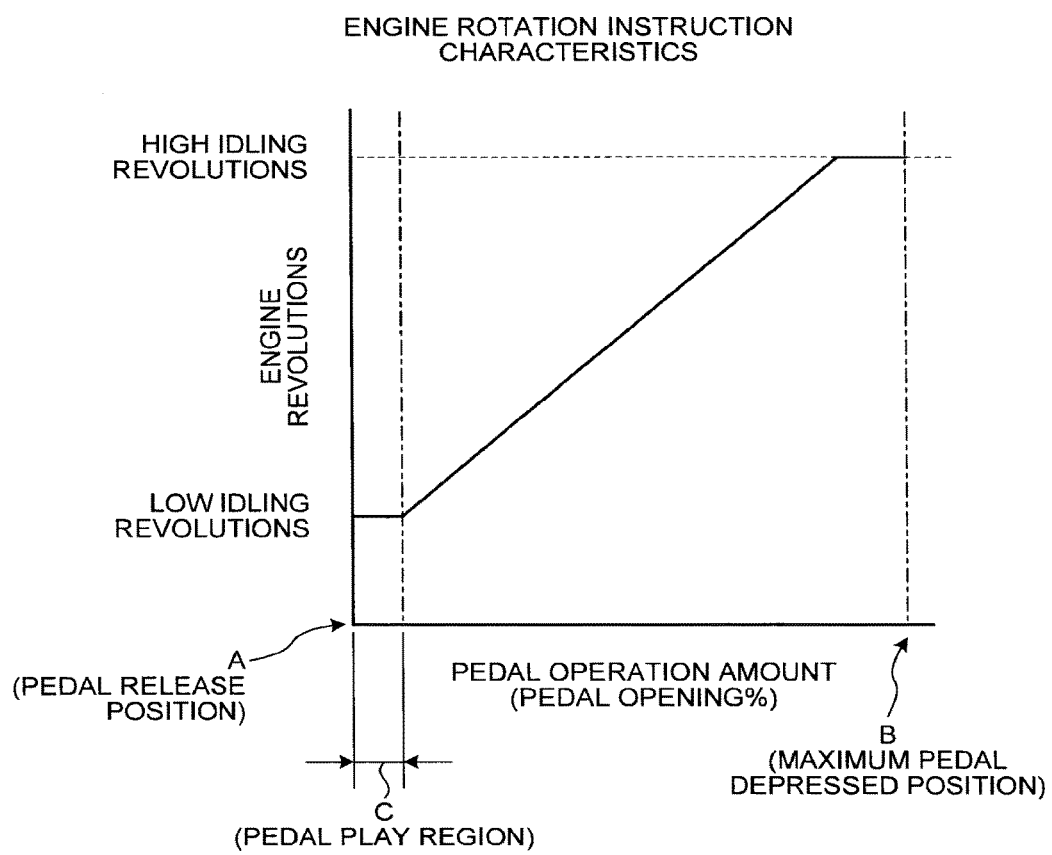
FIG. 6 is an engine rotation instruction characteristic diagram indicating a relation between an operation amount of the speed change pedal and the number of revolutions of an engine.
Figure 7:
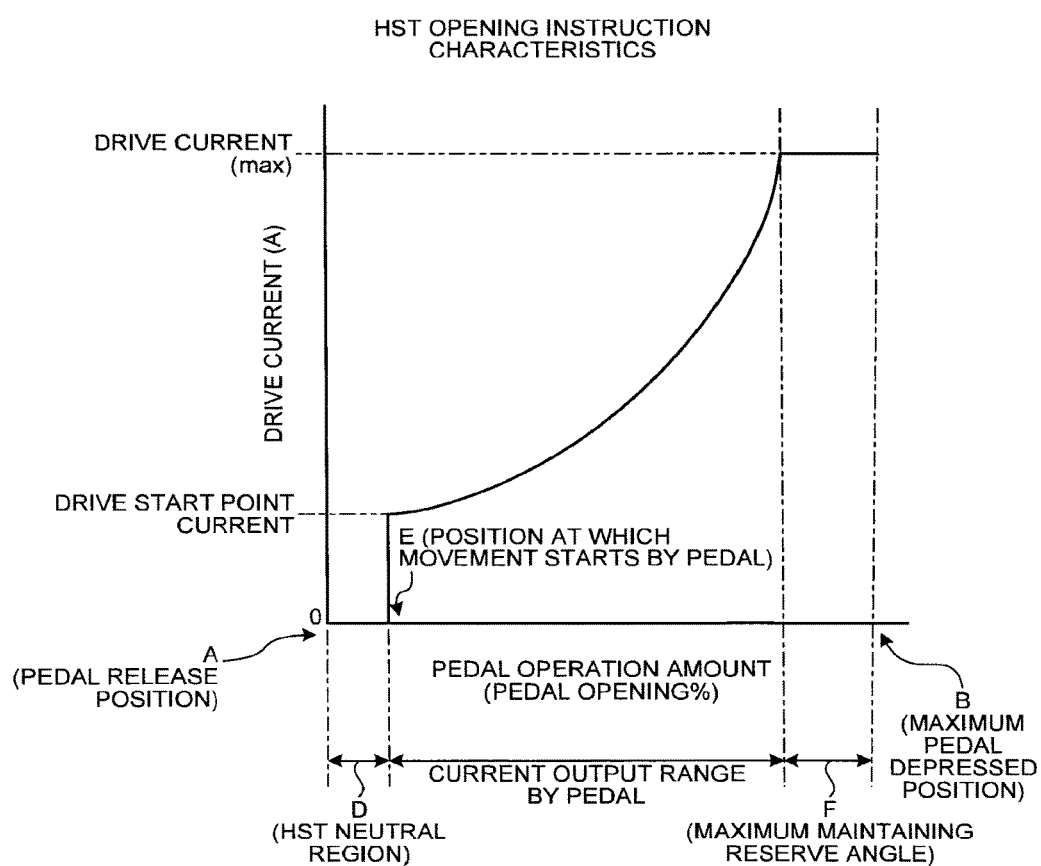
FIG. 7 is an opening instruction characteristic diagram indicating a relation between the operation amount of the speed change pedal and a drive current applied to a hydraulic continuously variable speed transmission.
Figure 8:
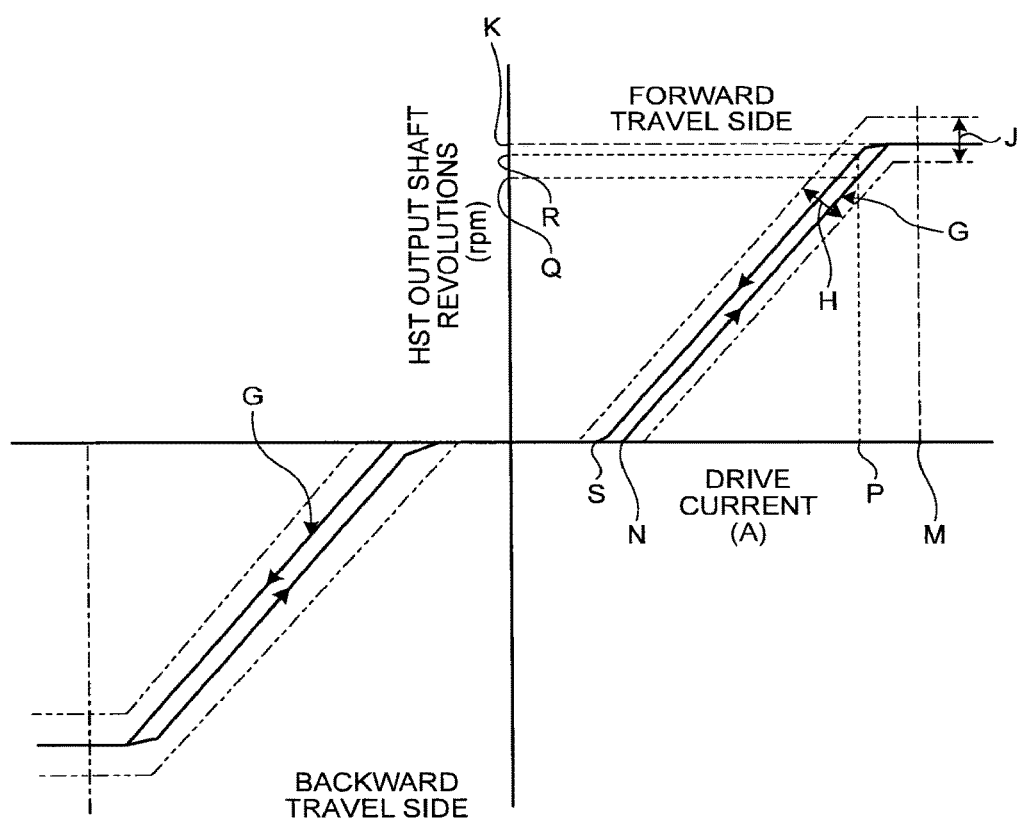
FIG. 8 is an explanatory diagram of a relation between the number of revolutions of an output shaft of the hydraulic continuously variable speed transmission and a drive current value.

The tractor 1 according to the present embodiment has the above configuration, and the following describes its action. FIG. 6 is an engine rotation instruction characteristic diagram indicating a relation between an operation amount of the speed change pedal 22 and the number of revolutions of the engine 7. FIG. 7 is an opening instruction characteristic diagram indicating a relation between the operation amount of the speed change pedal 22 and a drive current applied to the hydraulic continuously variable speed transmission 8. FIG. 8 is an explanatory diagram of a relation between the number of revolutions of an output shaft of the hydraulic continuously variable speed transmission 8 and a drive current value.

In the engine rotation instruction characteristic diagram illustrated in FIG. 6, the horizontal axis indicates a depressing amount as a pedal operation amount, whereas the vertical axis indicates the number of revolutions of the engine. "A" in the horizontal axis corresponds to the pedal release position A in FIG. 5, for example, whereas "B" corresponds to the maximum pedal depressed position B in FIG. 5. The depressing amount (operation amount) of the speed change pedal 22 is equivalent to the percentage of a pedal opening of the speed change pedal 22 when it is depressed. A pedal play region C is provided from the pedal release position A to a depressing side. This pedal play region C overlaps with a low-speed idling holding position of the engine 7.

As illustrated in the drawing, it is revealed that the number of revolutions of the engine of the tractor 1 according to the present embodiment basically linearly changes by the depressing amount of the speed change pedal 22. The number of revolutions of the engine is not necessarily required to change strictly linearly. The number of revolutions of the engine may be designed so as to change slowly in a quadratic curve manner, for example.

In the opening instruction characteristic diagram illustrated in FIG. 7, the horizontal axis indicates the depressing amount as the pedal operation amount, whereas the vertical axis indicates a drive current applied to the hydraulic continuously variable speed transmission 8. A in the horizontal axis corresponds to the pedal release position A in FIG. 5, for example, whereas B corresponds to the maximum pedal depressed position B in FIG. 5. A detection value of the speed change pedal sensor 321 indicating the release position A is stored in the travel system ECU 32 as an initial value in advance.

An HST neutral region D is provided from the pedal release position A to the depressing side. This HST neutral region D is a region in which the trunnion shaft angle of the hydraulic continuously variable speed transmission 8 in the present embodiment is neutral. A starting position E at which a drive start point current is applied is set on the depressing side of the HST neutral region D. In other words, the hydraulic continuously variable speed transmission 8 starts up at a depressed position side of the speed change pedal 22 away from the HST neutral region D. When the speed change pedal 22 is further depressed, the drive current increases, in which the ratio between the pedal operation amount and the drive current is not constant and changes caused by the fact that a turning shaft of the speed change pedal 22 and a turning shaft of the speed change pedal sensor 321 are set at offset positions and the like. When the speed change pedal 22 is thus depressed, the travel system ECU 32 changes the drive current in a curved manner from zero rotation of the hydraulic continuously variable speed transmission 8.

On the near side of the maximum pedal depressed position B, a maximum maintaining reserve angle F designating the maximum opening of the hydraulic continuously variable speed transmission 8 is provided. In other words, in a section in which the maximum maintaining reserve angle F is maintained in the depressed position, an engine High idling state is provided.

FIG. 8 illustrates a relation between the number of revolutions of an output shaft of the hydraulic continuously variable speed transmission 8 and a drive current value and illustrates measurement data of the drive current value and an HST output shaft revolutions that measures a relation between a drive current given to a solenoid (not illustrated) that controls the actuator 84 that rotates the trunnion shaft 87 of the hydraulic continuously variable speed transmission and the HST output shaft revolutions detected by the HST output shaft rotation sensor.

As to the measurement data, although a designed change line G indicated by the solid line is assumed to be changed in design, actual measurement data has changes of a speed change width H and a maximum revolutions width J caused by characteristics for each hydraulic continuously variable speed transmission 8 or body 2. Given this situation, the tractor 1 according to the present embodiment is provided with an adjustment mode so as not to produce variations in travel speed characteristics among respective tractors 1.

In the adjustment mode, the measurement data of the drive current value and the HST output shaft revolutions that differ from one body 2 to another is stored in the travel system ECU 32 as control data.

The adjustment mode is performed at the time of final adjustment after assembly of the tractor 1 with no travel load applied by making the auxiliary speed change lever 310 neutral and interrupting the drive downstream of the hydraulic continuously variable speed transmission 8. In other words, first, in forward travel side measurement, as data during speed increase, the drive current is changed from zero at which the hydraulic continuously variable speed transmission 8 does not rotate to a maximum drive current value M large enough to obtain a maximum revolutions K, and the number of revolutions of the output shaft of the hydraulic continuously variable speed transmission 8 is measured.

A drive start current value N at the start of rotation and a speed increase near-maximum revolutions Q at a prescribed position (a position giving a near-maximum drive current value P that is 90% of the maximum drive current value M, for example) are stored in the travel system ECU 32 as the control data. The prescribed position giving the near-maximum drive current value P may be set at a position returned from the number of revolutions at the maximum pedal depressed position B (refer to FIG. 6 and FIG. 7) to the release side by about 100 to 200 revolutions. The maximum maintaining reserve angle F is provided on the release side of the prescribed position that gives the near-maximum drive current value P (refer to FIG. 7).

As data during speed decrease, the drive current is changed from the maximum drive current value M to zero, and a speed decrease near-maximum revolutions R and a drive stop current value S are stored in the travel system ECU 32, for example, as the control data. As to this drive stop current value S, an accurate value can be detected by performing measurement while causing the tractor 1 to actually travel.

Similarly to the above also for the backward travel side, the control data of the speed decrease side is stored in the travel system ECU 32. There is a small amount of time lag from when the drive current is given to when the hydraulic continuously variable speed transmission 8 rotates, and the number of revolutions after the lapse of a certain time after the drive current is given may be set as the control data.

The number of revolutions of the hydraulic continuously variable speed transmission 8 by a depressing depth of the speed change pedal 22 can be performed by giving a drive current value calculated from a control change rate calculated using the drive start current value N and the speed increase near-maximum revolutions Q on the speed increase side and the speed decrease near-maximum revolutions R and the drive stop current value S on the speed decrease side to the actuator 84.

The adjustment mode is thus provided, whereby the variations in travel characteristics among respective tractors 1 can be reduced as much as possible, for example. By the adjustment mode, the characteristics of the drive current changing the trunnion shaft angle of the hydraulic continuously variable speed transmission 8 are set, whereby changing to provide a desired starting position or to improve an acceleration feeling can be performed easily.

As an initial value of the speed change pedal 22, on the release side, it is desirable that engine Low idling adjustment be performed so as to provide a certain Low idling holding stroke by which low-speed rotation of the engine 7 is ensured. With this adjustment, the driver easily performs a slow-speed operation of the tractor 1.

As the initial value of the speed change pedal 22, on the depressing side, as described with reference to FIG. 7, adjustment may be performed so that High idling is ensured at the maximum depressed position, and the position giving the speed increase near-maximum revolutions Q that is lower in the number of revolutions than the engine High idling state may be set as a standard value of the depressing side. With this adjustment, an acceleration feeling of the driver improves.

In the adjustment mode, when a prescribed position at the depressing side is defined as the initial value of the speed change pedal 22, the number of revolutions of the engine 7 can be fixed to a prescribed revolutions and be stored in the travel system ECU 32 by a certain operation. With this operation, a setting operation is easy, and variations in setting results are reduced.

In the adjustment mode, when the initial value of the speed change pedal 22 is stored, the trunnion shaft angle of the hydraulic continuously variable speed transmission 8 can also be determined by operation so that it will change according to a primary curve obtained by connecting a prescribed stored position defined on the release side and a prescribed stored position defined on the depressing side with a straight line, not by actual measurement or the like. With this operation, performance with fewer variations can be obtained by a simple calculation formula.

The control unit of the tractor 1 according to the present embodiment, that is, the travel system ECU 32 has a plurality of travel modes as illustrated in FIG. 4B. The travel modes are selectable by the travel mode switching switch 325.

In other words, as described below in detail, as illustrated in FIG. 4B, the travel system ECU 32 has a travel speed adjustment mode as a first travel mode, an engine revolutions adjustment mode as a second travel mode, and an engine revolutions constant mode as a third travel mode and connects to the travel mode switching switch 325.

The travel modes are thus provided, whereby various requests of the driver can be fulfilled when work is performed by the tractor 1, for example. Examples of assumed requests of the driver include desiring to perform the rotation of the PTO shaft 11 in a constant manner, desiring to cause changes in the travel speed to have smooth change characteristics, desiring to make the travel speed constant, and desiring to cause a relation between the rotation of the PTO shaft 11 and the travel speed to have a constant ratio. Various requests are thus fulfilled by mode selection, whereby the accuracy of work can be improved, and driving operability during travel can be made favorable.

The travel speed adjustment mode as the first travel mode is a normal travel mode. FIGS. 9 is an explanatory diagrams of an example of speed change control on the tractor 1 as the work vehicle according to the embodiment, in which the position indicated by P1 is the first pedal position at which the number of revolutions of the engine 7 is maximized.

The following describes speed change control in the first travel mode. As illustrated in (a) of FIG. 9, the number of revolutions of the engine 7 changes substantially linearly relative to the operation amount (the depressing amount) of the speed change pedal 22 (refer to FIG. 6). In other words, the travel system ECU 32 maintains the ratio between the depressing amount by the depressing operation of the speed change pedal 22 and the number of revolutions of the engine 7 at constant.

It is desirable that the trunnion shaft angle of the hydraulic continuously variable speed transmission 8 also essentially change substantially linearly relative to the operation amount (the depressing amount) of the speed change pedal 22.

However, mechanical displacement or the like may occur between the speed change pedal 22 and the speed change pedal sensor 321 that actually detects the operation amount of this speed change pedal 22. In the present embodiment, as illustrated in FIG. 5, the pivot 222 as the turning support of the speed change pedal 22 and the turning support of the speed change pedal sensor 321 are offset from each other, for example.

Consequently, the detection result of the speed change pedal sensor 321 does not necessarily change linearly relative to the depressing operation of the speed change pedal 22 in some cases. In other words, the ratio between the depressing amount of the speed change pedal 22 and the trunnion shaft angle may fluctuate, and a change rate of the trunnion shaft angle relative to a change rate of the depressing amount of the speed change pedal 22 may fluctuate, for example. Specifically, the trunnion shaft angle of the hydraulic continuously variable speed transmission 8 can change so as to draw a quadratic curve relative to the depressing operation of the speed change pedal 22 as illustrated in (b) of FIG. 9.

When such a change is revealed, an actual vehicle speed also changes so as to draw a quadratic curve as illustrated in the broken line in (c) of FIG. 9. In other words, as the driver depresses the speed change pedal 22, the vehicle speed steeply changes, which makes driving operation difficult.

When the trunnion shaft angle changes in a quadratic curve manner, there is an advantage in that at the time of slow-speed drive or low-speed drive, the speed change is slow, which makes driving easy. Given this situation, the following control is performed for the controller 30 of the tractor 1 according to the present embodiment including the power transmission mechanism 3 in which at least the change rate of the trunnion shaft angle fluctuates to provide a nonlinear change rate, not a linear change rate, relative to the depressing operation of the speed change pedal 22.

Specifically, as illustrated in (b) of FIG. 9, control is performed so that the trunnion shaft angle of the hydraulic continuously variable speed transmission 8 is maximized at the second pedal position P2 set at the shallower position than the first pedal position P1 at which the number of revolutions of the engine 7 is maximized by the depressing operation of the speed change pedal 22. In other words, the trunnion shaft angle of the hydraulic continuously variable speed transmission 8 of the tractor 1 according to the present embodiment indicates a change as indicated by the solid line in (b) of FIG. 9 relative to the operation amount of the speed change pedal 22.

The control is performed, whereby the change of the vehicle speed of the tractor 1 gives a quadratic curve indicating that the change is slow at the low-speed side relative to the operation amount (the depressing amount) of the speed change pedal 22 as indicated by the solid line in (c) of FIG. 9. As the operation amount (the depressing amount) of the speed change pedal 22 increases, the speed change pedal 22 gives a linear change rate and the quadratic curve changes to a primary curve (straight line).

A strict linear shape is not necessarily required as long as it does not affect operability. When the speed change pedal 22 is operated, at and after a position beyond the second pedal position P2 at which the trunnion shaft angle of the hydraulic continuously variable speed transmission 8 is maximized, the travel speed depends only on the number of revolutions of the engine 7 responsive to the operation of the speed change pedal 22, for example. Consequently, even in this case, the speed change pedal 22 is still favorable in an operation feeling.

As described above, in the present embodiment, the travel system ECU 32 performs control so that the change rate of the trunnion shaft angle is smaller when the depressing amount of the speed change pedal 22 is smaller and is larger when the depressing amount is larger. In other words, the system controls the operation amount of the speed change pedal 22 so that a small speed change and a slow speed increase are enabled in the initial stage of operation, and after that, the operation amount of the speed change pedal 22 increases linearly at a certain speed change. Consequently, the tractor 1 according to the present embodiment implements an easy-to-perform slow-speed operation and eliminates the possibility of causing an uneasy feeling in an acceleration feeling and the like.

Figure 10A:
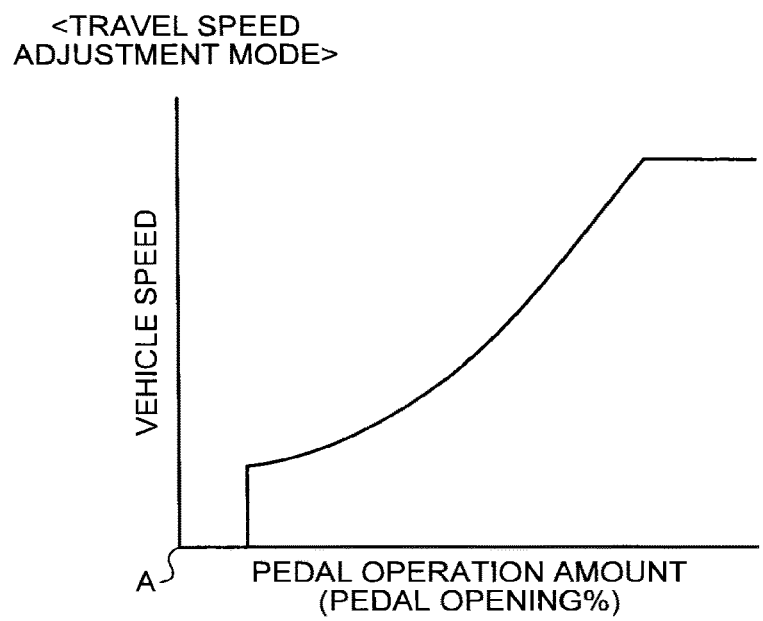
FIG. 10A is an explanatory diagram of a travel speed adjustment mode of the tractor.
Figure 10B:
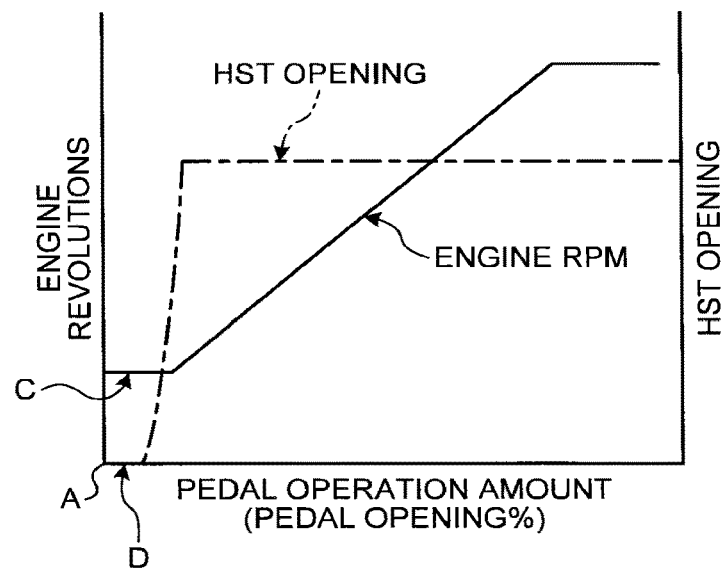
FIG. 10B is an explanatory diagram of an engine revolutions adjustment mode of the tractor.
Figure 10C:
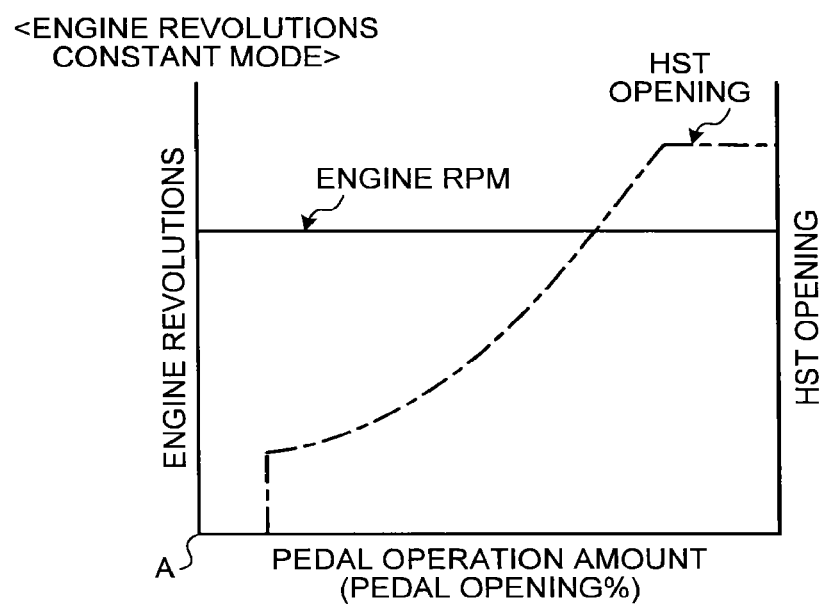
FIG. 10C is an explanatory diagram of an engine revolutions constant mode of the tractor.

FIGS. 10A to 10C are explanatory diagrams of the respective travel modes of the tractor 1. FIG. 10A is an explanatory diagram of the travel speed adjustment mode of the tractor 1, FIG. 10B is an explanatory diagram of the engine revolutions adjustment mode of the tractor 1, and FIG. 10C is an explanatory diagram of the engine revolutions constant mode of the tractor 1. In FIGS. 10A to 10C, the position indicated by A in the horizontal axis indicates the pedal release position (refer to FIG. 6 and FIG. 7).

As described above, in the first travel mode (the travel speed adjustment mode) in the present embodiment, the vehicle speed change is set so as to be small in the start of the movement and to be a certain speed change after that. However, as illustrated in FIG. 10A, the change rate of the vehicle speed can also be adjusted so as to slightly change relative to the depressing operation of the speed change pedal 22. The change rate of the vehicle speed or a degree of its change can appropriately be set.

As described above, in the first travel mode (the travel speed adjustment mode), the travel speed is instructed as a speed change rate by the operation of the speed change pedal 22. In the case of road traveling, for example, even when a travel load or the like occurs during the road traveling, the trunnion shaft angle of the hydraulic continuously variable speed transmission 8 and the number of revolutions of the engine 7 are changed so as to follow the travel load to give a constant speed change. Consequently, the travel speed change is a certain change, whereby operability during drive is made favorable.

Next, the following describes the engine revolutions adjustment mode as the second travel mode. As illustrated in FIG. 10B, in the second travel mode (the engine revolutions adjustment mode), the trunnion shaft angle of the hydraulic continuously variable speed transmission 8 does not change, whereas the number of revolutions of the engine 7 changes relative to the depressing operation of the speed change pedal 22.

In the second travel mode, in work desired to be performed while a constant vehicle speed is maintained such as plow work for plowing soil of cultivated lands, for example, the trunnion shaft angle of the hydraulic continuously variable speed transmission 8 does not change relative to the depressing operation of the speed change pedal 22, whereas only the number of revolutions of the engine 7 changes in accordance with the pedal operation, whereby adjustment when maintaining the vehicle speed can intuitively be performed, and vehicle speed adjustment can easily be performed.

In the plow work, it is desirable that the travel speed be constant in order to uniformly reverse soil. In the second travel mode (the engine revolutions adjustment mode), the trunnion shaft angle of the hydraulic continuously variable speed transmission 8 is fixed, and the operation of the speed change pedal 22 is directly coupled to fluctuations of the number of revolutions of the engine 7, whereby it is easy to maintain the speed at constant by an intuitive pedal operation. When the work vehicle approaches a place in which the soil is hard, a load increases, and the speed decreases, for example, the number of revolutions of the engine 7 may be increased by the operation of the speed change pedal 22, whereby speed adjustment by the driver is easy.

In the second travel mode, the number of revolutions of the engine 7 substantially linearly changes in accordance with the depressing operation of the speed change pedal 22 while the trunnion shaft angle of the hydraulic continuously variable speed transmission 8 is fixed. Consequently, the second travel mode is also suitable for work by a work machine that is used by being coupled to the PTO shaft 11 that takes power out of the engine 7 and in which output is desirably fluctuated by a speed change pedal operation.

In the second travel mode, the fixation of the trunnion shaft angle can easily be set by the trunnion shaft angle setting dial 327 with good operability (refer to FIG. 1 and FIG. 4A). This trunnion shaft angle setting dial 327 can set the trunnion shaft angle of the hydraulic continuously variable speed transmission 8 to any value, and by operating this dial, the output of the hydraulic continuously variable speed transmission 8 can be maintained at a desired magnitude.

In the second travel mode, the trunnion shaft angle of the hydraulic continuously variable speed transmission 8 should be set so as to be neutral at the release position A, in which the speed change pedal 22 is in a non-operation state. In other words, as illustrated in FIG. 10B, the HST neutral region D (refer to FIG. 7) is provided on the pedal release position side, whereby the body 2 can be stopped when the speed change pedal 22 is released, and an operating error is prevented to ensure safety. In the drawing, C indicates the pedal play region (refer to FIG. 6).

As illustrated in FIG. 10B, this example should be set so as to have an area in which a drive start position of the hydraulic continuously variable speed transmission 8 and the low-speed side idling holding position of the engine 7, that is, the mechanical play region C overlap with each other. With this setting, it is easy to perform a slow-speed operation at the start of operation. Furthermore, in this situation, the HST neutral region D may also be a region that is substantially the same as the idling holding position and the play region C in size.

As illustrated in the drawing, until the trunnion shaft angle becomes a constant value set by the trunnion shaft angle setting dial 327 from the HST neutral region D, the number of revolutions of the engine 7 is changed so as to draw a certain rising curve responsive to the depressing of the speed change pedal 22. With this operation, at the start of travel or the like, a slow-speed operation region in which the vehicle speed slowly changes is provided as illustrated in (c) of FIG. 9, whereby the operability of the speed change pedal 22 improves.

As illustrated in FIG. 10C, in the third travel mode (the engine revolutions constant mode), the number of revolutions of the engine 7 does not change, whereas the trunnion shaft angle of the hydraulic continuously variable speed transmission 8 changes relative to the depressing operation of the speed change pedal 22.

In the third travel mode (the engine revolutions constant mode), in the case of work that takes the power of the engine 7 out of the mid PTO shaft 11M such as mower work performing mowing, for example, work can be performed in a favorable condition with a constant engine revolutions.

In the third travel mode, the fixation of the number of revolutions of the engine 7 can easily be set by the engine rotation setting dial 326 with good operability (refer to FIG. 1 and FIG. 4A). This engine rotation setting dial 326 can set the number of revolutions of the engine 7 to any value, and by operating this dial, the output of the engine 7 can be maintained at a desired constant magnitude. As illustrated in FIG. 10C, the number of revolutions of the engine 7 is maintained at the set value even at the pedal release position A in this example. Consequently, the rotation of the mid PTO shaft 11M is maintained at constant at all times, whereby operability improves in the mower work using a mower, grass cutter, or the like.

Although the PTO shaft is the mid PTO shaft 11M in this example, this is not limiting, and some work machines can be applied to one that takes the power out of the rear PTO shaft 11R. The fixing operation of the number of revolutions of the engine 7 and the trunnion shaft angle of the hydraulic continuously variable speed transmission 8 may also be lever-operated, for example, not dial-operated as in the engine rotation setting dial 326 and the trunnion shaft angle setting dial 327; its form can appropriately be designed.

Figure 11:
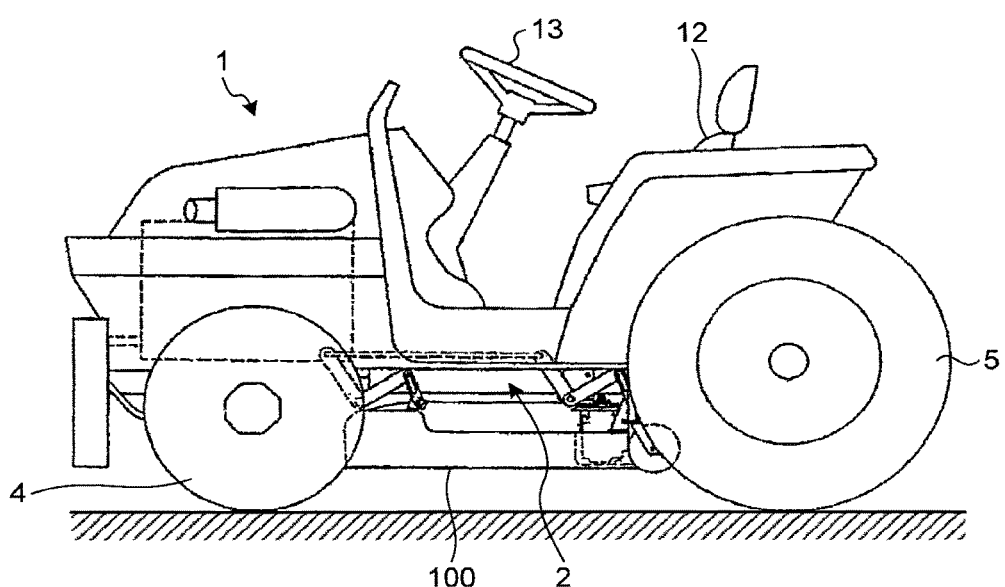
FIG. 11 is a side view of a tractor as a work vehicle according to a modification.

FIG. 11 is a side view of the tractor 1 on which a mower 100 is mounted as a modification of the work vehicle. The mower 100 rotates a cutting blade by obtaining power from the mid PTO shaft 11M. When performing mowing work, for example, favorable work is easily performed if the rotation of the mid PTO shaft 11M is constant. When the mower 100 is mounted, the third travel mode (the engine revolutions constant mode) is set, whereby the number of revolutions of the engine 7 is constant, and the mower 100 can be operated at constant rotation even while the body 2 is stopped, for example. As to the travel speed, the trunnion shaft angle of the hydraulic continuously variable speed transmission 8 is changed by operating the speed change pedal 22, whereby speed adjustment can easily be performed.

As described above, these travel mode switching operations are performed by the travel mode switching switch 325 (refer to FIG. 1, FIG. 4A, and FIG. 4B) provided near the operating seat 12, for example.

In order to achieve pieces of control by the respective travel modes, the travel system ECU 32 may include instruction value tables in which the number of revolutions of the engine 7 and the trunnion shaft angle of the hydraulic continuously variable speed transmission 8 are associated with each other corresponding to the respective first travel mode, second travel mode, and third travel mode, for example. In other words, the read only memory (ROM) of the travel system ECU 32 stores therein these tables, and the central processing unit (CPU) executes a travel control program similarly stored, whereby the travel characteristics in the respective modes are achieved.

With the configuration having the instruction value tables of the number of revolutions of the engine 7 and the trunnion shaft angle of the hydraulic continuously variable speed transmission 8 enables easy speed change control. With an actual vehicle speed deviating relative to the depressed position by the operation of the speed change pedal 22, if the actual number of revolutions of the engine 7 is higher than in the instruction value table at that time, the trunnion shaft angle can be changed to reduce output, and control to give a desired designated speed. The instruction value table includes a plurality of instruction value tables corresponding to various conditions, whereby when the actual vehicle speed deviates relative to the depressed position by the operation of the speed change pedal 22, for example, an optimum instruction value table is read to enable travel control.

As described above, when the actual vehicle speed deviates relative to the depressed position by the operation of the speed change pedal 22, without using the instruction value table, means for reporting the deviation of the vehicle speed and a throttle lever or the like that changes the number of revolutions of the engine 7 by a manual operation by the driver may be included.

Reference Example

In the above tractor 1, the speed change pedal sensor 321 cannot detect the change in the operation amount of the speed change pedal 22 linearly caused by the mechanical structure in view of design, and the ratio between the depressing amount of the speed change pedal 22 and the trunnion shaft angle fluctuates. Given this situation, the following describes an example that corrects the fluctuation. The following describes an example that changes a servo current value driving the trunnion shaft 87 of the hydraulic continuously variable speed transmission 8 by certain characteristics.

Figure 12A:
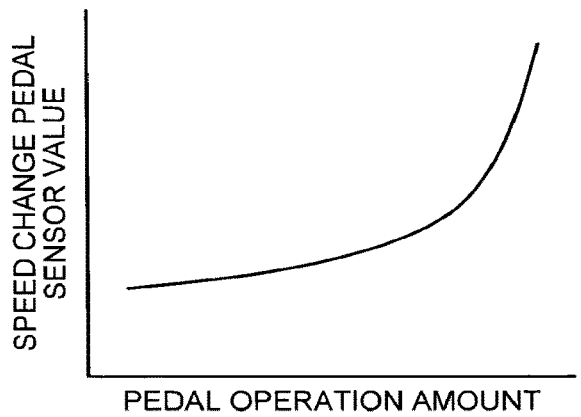
FIG. 12A is an explanatory diagram of a relation between an operation amount of a speed change pedal and a sensor value responsive to the operation amount of the speed change pedal of a normal tractor.
Figure 12B:
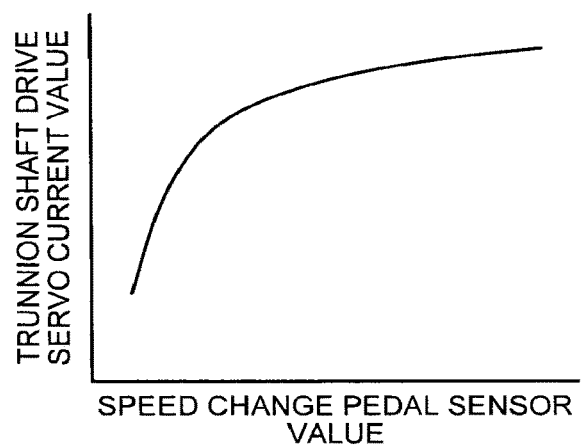
FIG. 12B is an explanatory diagram of a relation between a sensor value responsive to an operation amount of a speed change pedal and a drive servo current value of a trunnion shaft of a hydraulic continuously variable speed transmission for a work vehicle according to a reference example.
Figure 12C:
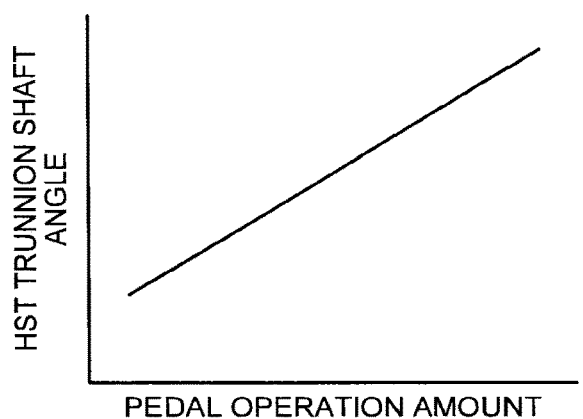
FIG. 12C is an explanatory diagram of a relation between the operation amount of the speed change pedal and a trunnion shaft angle of the hydraulic continuously variable speed transmission for the work vehicle according to the reference example.

FIG. 12A is an explanatory diagram of a relation between an operation amount of a speed change pedal and a sensor value responsive to the operation amount of the speed change pedal of a normal tractor, FIG. 12B is an explanatory diagram of a relation between a sensor value responsive to an operation amount of a speed change pedal and a drive servo current value of a trunnion shaft of a hydraulic continuously variable speed transmission of a tractor as a work vehicle according to a reference example, and FIG. 12C is an explanatory diagram of a relation between the operation amount of the speed change pedal and a trunnion shaft angle of the hydraulic continuously variable speed transmission of the tractor as the work vehicle according to the reference example.

As illustrated in FIG. 12A, the sensor value of the speed change pedal changes in a quadratic curve manner, not linearly. Consequently, the trunnion shaft angle changes also nonlinearly (refer to (b) of FIG. 9). Given this situation, a drive servo current value having the characteristics illustrated in FIG. 12B is generated for the sensor value, and the drive servo current value is applied to the hydraulic continuously variable speed transmission, whereby the trunnion shaft angle can be changed linearly as illustrated in FIG. 12C. Consequently, from the beginning to the end of the depressing operation of the speed change pedal, the travel speed is easy to be changed linearly relative to the depressing operation of the speed change pedal.

The above embodiment can achieve the following controller 30 (the speed change control apparatus) of the tractor 1 (the work vehicle).

(1) The controller 30 (the speed control apparatus) of the tractor 1 (the work vehicle) including the hydraulic continuously variable speed transmission 8 that performs speed change on power input from the engine 7 by changing the trunnion shaft angle and outputs the power in which the ratio between the depressing amount of the speed change pedal 22 and the trunnion shaft angle fluctuates, the controller 30 of the tractor 1 including the speed change pedal sensor 321 (the pedal position detector) that detects the pedal position responsive to the depressing amount of the speed change pedal 22 and the travel system ECU 32 (the control unit) that controls the number of revolutions of the engine 7 and the trunnion shaft angle of the hydraulic continuously variable speed transmission 8 based on the detection value of the speed change pedal sensor 321, the travel system ECU 32 performing control so that the trunnion shaft angle is maximized at the second pedal position P2 set to the position shallower than the first pedal position P1 at which the number of revolutions of the engine 7 is maximized by the depressing operation of the speed change pedal 22.

In the controller 30 (the speed control apparatus) of the tractor 1 (the work vehicle) in (1), when the speed change pedal 22 is operated, at and after the position beyond the depressing amount at which the trunnion shaft angle of the hydraulic continuously variable speed transmission 8 is maximized, the travel speed depends only on the number of revolutions of the engine responsive to the pedal operation, whereby the operation feeling of the speed change pedal 22 is made favorable.

(2) The controller 30 of the tractor 1 in (1), in which the travel system ECU 32 performs control so that the change rate of the trunnion shaft angle is smaller when the depressing amount of the speed change pedal 22 is smaller and is larger when the depressing amount is larger.

In the controller 30 (the speed control apparatus) of the tractor 1 (the work vehicle) in (2), the slow-speed operation is easily performed in the initial stage of operation of the speed change pedal 22, and the possibility of causing a sense of incongruity is eliminated in an acceleration feeling and the like when the depressing amount is deeper.

(3) The controller 30 of the tractor 1 in (1) or (2), in which the travel system ECU 32 performs control so that the ratio between the depressing amount of the speed change pedal 22 and the number of revolutions of the engine 7 is constant.

In the controller 30 (the speed control apparatus) of the tractor 1 (the work vehicle) in (3), when the speed change pedal is operated, at and after the position beyond the depressed position at which the trunnion shaft angle of the hydraulic continuously variable speed transmission is maximized, the travel speed linearly changes, whereby the operation feeling of the speed change pedal is made more favorable.

(4) The controller 30 of the tractor 1 in any one of (1) to (3), in which the travel system ECU 32 stores therein the respective detection values of the speed change pedal sensor 321 at the release position A of the speed change pedal 22 and the prescribed position (the position giving the near-maximum drive current value P that is 90% of the maximum drive current value M) shallower than the first pedal position P1 as initial values and sets the characteristics of the drive current that changes the trunnion shaft angle based on the initial values.

In the controller 30 (the speed control apparatus) of the tractor 1 (the work vehicle) in (4), setting can be performed that causes the slow-speed operation in the initial stage of operation of the speed change pedal 22 to be easily performed.

(5) The controller 30 of the tractor 1 in (4), in which the travel system ECU 32 sets the characteristics of the drive current so that the maximum maintaining reserve angle F that maintains the trunnion shaft angle at the maximum level is provided on the release side of the prescribed position.

In the controller 30 (the speed control apparatus) of the tractor 1 (the work vehicle) in (5), initial value setting for each work vehicle is easily performed, a starting operation is stabilized, and the travel characteristics in which the slow-speed operation is easily performed can be obtained.

The above embodiment discloses the following controller 30 (the speed control apparatus) of the tractor (the work vehicle).

(6) The controller 30 of the tractor 1 in (4) or (5), in which the travel system ECU 32 sets the characteristics of the drive current so that the neutral region D in which the trunnion shaft angle is neutral is provided on the depressing side of the release position A stored as the initial value.

(7) The controller 30 (the speed control apparatus) of the tractor 1 (the work vehicle) including the hydraulic continuously variable speed transmission 8 that performs speed change on power input from the engine 7 by changing the trunnion shaft angle and outputs the power, the controller 30 of the tractor 1 including the speed change pedal sensor 321 (the pedal position detector) that detects the pedal position responsive to the depressing amount of the speed change pedal 22 and the travel system ECU 32 (the control unit) that controls the number of revolutions of the engine 7 and the trunnion shaft angle of the hydraulic continuously variable speed transmission 8 based on the detection value of the speed change pedal sensor 321, the travel system ECU 32 including the engine revolutions adjustment mode that does not change the trunnion shaft angle of the hydraulic continuously variable speed transmission 8 and changes the number of revolutions of the engine 7 relative to the depressing operation of the speed change pedal 22.

(8) The controller 30 of the tractor 1 in (7) including the mid PTO shaft 11M (the PTO shaft) that takes the output of the engine 7 out to the outside, in which the travel system ECU 32 further includes the travel speed adjustment mode that adjusts the number of revolutions of the engine and the trunnion shaft angle of the hydraulic continuously variable speed transmission so that the change rate of the travel speed is constant relative to the depressing operation of the speed change pedal 22 and the engine revolutions constant mode that does not change the number of revolutions of the engine 7 and changes the trunnion shaft angle of the hydraulic continuously variable speed transmission 8 relative to the depressing operation of the speed change pedal 22.

(9) The controller 30 of the tractor 1 in (8) including the travel mode switching switch 325 that switches between the respective modes, in which the travel system ECU 32 includes the instruction value tables of the number of revolutions of the engine 7 and the trunnion shaft angle of the hydraulic continuously variable speed transmission 8 corresponding to the respective modes.

(10) The controller 30 of the tractor 1 in any one of (7) to (9), in which the travel system ECU 32 performs control so that the trunnion shaft angle of the hydraulic continuously variable speed transmission 8 is neutral at the release position A in which the speed change pedal 22 is in a non-operation state in the engine revolutions adjustment mode.

(11) The controller 30 of the tractor 1 in any one of (8) to (10) including the engine rotation setting dial 326 that sets the number of revolutions of the engine 7 to a constant value and the trunnion shaft angle setting dial 327 that sets the trunnion shaft angle of the hydraulic continuously variable speed transmission 8 to a constant value, the controller 30 changing the number of revolutions of the engine 7 by the operation of the speed change pedal 22 and maintaining the trunnion shaft angle of the hydraulic continuously variable speed transmission 8 at the value set by the trunnion shaft angle setting dial 327 in the engine revolutions adjustment mode and changing the trunnion shaft angle of the hydraulic continuously variable speed transmission 8 by the operation of the speed change pedal 22 and maintaining the number of revolutions of the engine 7 at the value set by the engine rotation setting dial 326 in the engine revolutions constant mode.

The above embodiment is only an example and does not intend to limit the scope of the invention. The embodiment can be performed in other various forms, and various omissions, replacements, combinations, and modifications can be made without departing from the essence of the invention. The respective configurations and specifications such as shape and display element (structure, type, direction, shape, size, length, width, thickness, height, number, arrangement, position, material, or the like) can appropriately be modified to be performed.

As illustrated in (1), in the first travel mode among the travel modes, the travel system ECU 32 performs control so that the trunnion shaft angle of the hydraulic continuously variable speed transmission 8 is maximized at the second pedal position P2 set to the position shallower than the first pedal position P1 at which the number of revolutions of the engine 7 is maximized relative to the depressing operation of the speed change pedal 22, for example. However, the control may be applied even when the travel modes are not included.

The work vehicle 1 may appropriately combine the configurations, the pieces of control, or the like used in the embodiment and the modification or may use ones other than the configurations and the pieces of control.

In an aspect of the embodiment, when the speed change pedal is operated, at and after a position beyond a depressing amount at which the trunnion shaft angle of the hydraulic continuously variable speed transmission is maximized, a travel speed depends only on the number of revolutions of the engine responsive to a pedal operation, whereby an operation feeling of the speed change pedal is made favorable.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A speed change control apparatus for a work vehicle, the speed change control apparatus comprising:
a hydraulic continuously variable speed transmission that performs speed change on power that is input from an engine by changing a trunnion shaft angle based on a depressing amount of a speed change pedal and outputs the power;
a pedal position detector that detects a pedal position responsive to the depressing amount of the speed change pedal; and
a control unit that controls a number of revolutions of the engine and the trunnion shaft angle of the hydraulic continuously variable speed transmission based on the pedal position detected by the pedal position detector, wherein
the pedal position includes a first pedal position and a second pedal position that corresponds to a second depressing amount of the speed change pedal that is less than a first depressing amount of the speed change pedal that corresponds to the first pedal position, and
the control unit performs control so that
at a pedal position between the first pedal position and the second pedal position, a vehicle speed of the work vehicle changes linearly, and at a pedal position between a release position of the speed change pedal and the second pedal position, a change rate of the vehicle speed of the work vehicle is non-linear such that it decreases with decreasing the depressing amount of the speed change pedal and increases with increasing the depressing amount.

2. The speed change control apparatus for the work vehicle according to claim 1, wherein
the number of revolutions of the engine is maximized at the first pedal position,
the trunnion shaft angle is maximized at the second pedal position, and
the control unit performs control so that a change rate of the trunnion shaft angle is decreased with decreasing the depressing amount of the speed change pedal and is increased with increasing the depressing amount.

3. The speed change control apparatus for the work vehicle according to claim 1, wherein the control unit performs control so that a ratio between the depressing amount of the speed change pedal and the number of revolutions of the engine is constant.

4. The speed change control apparatus for the work vehicle according to claim 2, wherein the control unit performs control so that a ratio between the depressing amount of the speed change pedal and the number of revolutions of the engine is constant.

5. The speed change control apparatus for the work vehicle according to claim 1, wherein the control unit stores therein the pedal position detected by the pedal position detector at the release position of the speed change pedal as an initial value and sets characteristics of a drive current that changes the trunnion shaft angle based on the initial value.

6. The speed change control apparatus for the work vehicle according to claim 2, wherein the control unit stores therein the pedal position detected by the pedal position detector at the release position of the speed change pedal as an initial value and sets characteristics of a drive current that changes the trunnion shaft angle based on the initial value.

7. The speed change control apparatus for the work vehicle according to claim 3, wherein the control unit stores therein the pedal position detected by the pedal position detector at the release position of the speed change pedal as an initial value and sets characteristics of a drive current that changes the trunnion shaft angle based on the initial value.

8. The speed change control apparatus for the work vehicle according to claim 4, wherein the control unit stores therein the pedal position detected by the pedal position detector at the release position of the speed change pedal as an initial value and sets characteristics of a drive current that changes the trunnion shaft angle based on the initial value.

9. The speed change control apparatus for the work vehicle according to claim 5, wherein the control unit sets the characteristics of the drive current so that a neutral region at which the trunnion shaft angle is neutral is provided on a second pedal position side of the release position of the speed change pedal stored as the initial value.

10. The speed change control apparatus for the work vehicle according to claim 6, wherein the control unit sets the characteristics of the drive current so that a neutral region at which the trunnion shaft angle is neutral is provided on a second pedal position side of the release position of the speed change pedal stored as the initial value.

11. The speed change control apparatus for the work vehicle according to claim 7, wherein the control unit sets the characteristics of the drive current so that a neutral region at which the trunnion shaft angle is neutral is provided on a second pedal position side of the release position of the speed change pedal stored as the initial value.

12. The speed change control apparatus for the work vehicle according to claim 8, wherein the control unit sets the characteristics of the drive current so that a neutral region at which the trunnion shaft angle is neutral is provided on a second pedal position side of the release position of the speed change pedal stored as the initial value.

* * * * *